(12) United States Patent
Wada (10) Patent No.: US 11,287,604 B2
(45) Date of Patent: Mar. 29, 2022

(54) LENS DEVICE, LENS SYSTEM, IMAGING DEVICE, MOVABLE LENS OPERATION DEVICE, LENS DRIVING METHOD, AND LENS DRIVING PROGRAM

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 584 days.

(21) Appl. No.: 16/127,251

(22) Filed: Sep. 11, 2018

(65) Prior Publication Data

US 2019/0025541 A1    Jan. 24, 2019

Related U.S. Application Data

(63) Continuation of application No. PCT/JP2017/003813, filed on Feb. 2, 2017.

(30) Foreign Application Priority Data

Mar. 31, 2016  (JP) .............................. JP2016-070726

(51) Int. Cl.
*G02B 7/09* (2021.01)
*G02B 7/10* (2021.01)
(Continued)

(52) U.S. Cl.
CPC ................. *G02B 7/09* (2013.01); *G02B 7/04* (2013.01); *G02B 7/08* (2013.01); *G02B 7/102* (2013.01);
(Continued)

(58) Field of Classification Search
CPC ....................................................... G02B 7/09
See application file for complete search history.

(56) References Cited

U.S. PATENT DOCUMENTS 5,561,561 A * 10/1996 Fukino ..................... G02B 7/08
359/694
2004/0114251 A1 * 6/2004 Kaneda .................. G02B 7/102
359/694
(Continued)

FOREIGN PATENT DOCUMENTS

CN     103460102    12/2013
CN     104094150    10/2014
(Continued)

OTHER PUBLICATIONS

"Office Action of China Counterpart Application," dated Mar. 20, 2019, with English translation thereof, p. 1-p. 10.
(Continued)

*Primary Examiner* — Noam Reisner
(74) *Attorney, Agent, or Firm* — JCIPRNET (57) ABSTRACT

A lens device includes: a movable lens capable of being moved in a direction of an optical axis; a target position information acquiring unit that acquires information of a target position of the movable lens; a target position information transmitting unit that transmits the information of the target position to a movable lens operation device including a movable operating member for moving the movable lens and an operating member driving unit that drives the operating member; and a movable lens driving unit that performs first driving for moving the movable lens based on a position of the operating member detected by an operating member position detection unit that detects the position of the operating member, and the operating member driving unit drives the operating member based on the information of the target position.

2 Claims, 7 Drawing Sheets

(51) Int. Cl.
  *G02B 7/04* (2021.01)
  *G03B 3/10* (2021.01)
  *G02B 7/28* (2021.01)
  *G02B 7/08* (2021.01)
  *H04N 5/232* (2006.01)
  *G02B 7/34* (2021.01)
  *G03B 5/00* (2021.01)
  *G03B 3/12* (2021.01)
  *G03B 13/20* (2021.01)
  *G03B 13/36* (2021.01)

(52) U.S. Cl.
  CPC ............... *G02B 7/28* (2013.01); *G02B 7/34* (2013.01); *G03B 3/10* (2013.01); *G03B 3/12* (2013.01); *G03B 5/00* (2013.01); *G03B 13/20* (2013.01); *H04N 5/23209* (2013.01); *H04N 5/23212* (2013.01); *H04N 5/23245* (2013.01); *H04N 5/23296* (2013.01); *H04N 5/232121* (2018.08); *H04N 5/232122* (2018.08); *H04N 5/232127* (2018.08); *G03B 13/36* (2013.01); *G03B 2205/0053* (2013.01)

(56) References Cited

U.S. PATENT DOCUMENTS

| | | |
|---|---|---|
| 2005/0232618 A1 | 10/2005 | Kaneda et al. |
| 2006/0165403 A1* | 7/2006 | Ito .................... H04N 5/232122 396/123 |
| 2011/0158627 A1 | 6/2011 | Hirai et al. |
| 2014/0029121 A1 | 1/2014 | Mitarai |
| 2014/0327813 A1 | 11/2014 | Manishi |

FOREIGN PATENT DOCUMENTS

| | | |
|---|---|---|
| JP | 2004144802 | 5/2004 |
| JP | 2006171443 | 6/2006 |
| JP | 2006284792 | 10/2006 |
| JP | 2010164637 | 7/2010 |
| JP | 2011138018 | 7/2011 |

OTHER PUBLICATIONS

"International Preliminary Report on Patentability (Form PCT/IPEA/409) of PCT/JP2017/003813," completed on Oct. 16, 2017, with English translation thereof, pp. 1-7.

"International Search Report (Form PCT/ISA/210) of PCT/JP2017/003813," dated May 9, 2017, with English translation thereof, pp. 1-5.

* cited by examiner

LENS DEVICE, LENS SYSTEM, IMAGING DEVICE, MOVABLE LENS OPERATION DEVICE, LENS DRIVING METHOD, AND LENS DRIVING PROGRAM

CROSS REFERENCE TO RELATED APPLICATION

This is a continuation of International Application No. PCT/JP2017/003813 filed on Feb. 2, 2017, and claims priority from Japanese Patent Application No. 2016-070726 filed on Mar. 31, 2016, the entire disclosures of which are incorporated herein by reference.

BACKGROUND OF THE INVENTION

1. Field of the Invention

The present invention relates to a lens device, a lens system, an imaging device, a movable lens operation device, a lens driving method, and a computer readable medium storing a lens driving program.

2. Description of the Related Art

A lens system is known which is provided with a lens device including a focus lens for changing a focus position movably in the direction of an optical axis, and an operation device for manually moving this focus lens. An example of the operation device includes a so-called focus demand or the like that moves a focus lens by rotating a rotatable operating member.

In such a lens system, the lens device may perform auto focus (AF) control for automatically moving the focus lens (see JP2010-164637A and JP2011-138018A).

JP2010-164637A and JP2011-138018A disclose a lens system in which, in a case where an operation device is operated in a state where AF control is performed, switching to manual focus (MF) control for moving the focus lens is performed in accordance with the operation of the operation device.

SUMMARY OF THE INVENTION

As in JP2010-164637A and JP2011-138018A, the operation device for performing the MF control is caused to have a function of performing an instruction for switching between the AF control and the MF control, and thus it is possible to achieve the simplification of the lens system by dispensing with a dedicated member for this switching instruction.

However, in JP2010-164637A and JP2011-138018A, since the position of the focus lens and the operation position of an operating member during the AF control are not linked to each other, it is not possible to intuitively ascertain the position of the focus lens during the AF control.

The capability of ascertainment of the position of the focus lens during the AF control by viewing the operation device makes it possible for an operator to know the position of the focus lens which is determined by a machine, and thus it is possible to support an imaging operation.

Meanwhile, in a lens system for broadcast, a system is present which is capable of remotely controlling the position of a focus lens in a lens device.

In this system, a person located at a separate place from that of an operator who operates the lens device in his (or her) hand operates an electronic device connected to the lens device and indicates a target position of the focus lens. The lens device moves the focus lens to the indicated target position during the AF control.

In this manner, in a system in which the position of the focus lens during the AF control is remotely controlled, the capability of ascertainment of the intention of a person who indicates the position of the focus lens by viewing the operation device also makes it possible to support an imaging operation for an operator in the field.

Thus far, an example has been given of the focus lens used as a movable lens included in a lens device. An example of the movable lens included in the lens device includes a zoom lens for changing a focal length movably in the direction of an optical axis.

In a lens system which is provided with a lens device including a zoom lens and an operation device (so-called zoom demand) for manually moving this zoom lens, a configuration is also considered in which the position of the zoom lens can be remotely controlled.

In such a configuration, the capability of ascertainment of the position of the zoom lens during remote control by viewing the zoom demand also makes it possible to support an imaging operation for an operator in the field.

The present invention is contrived in view of such circumstances, and an object thereof is to provide a lens device, a lens system, an imaging device, a movable lens operation device, a lens driving method, and a lens driving program which are capable of supporting an imaging operation by making it possible to intuitively ascertain the position of a movable lens.

According to the present invention, there is provided a lens device comprising: a movable lens capable of being moved in a direction of an optical axis; a target position information acquiring unit that acquires information of a target position of the movable lens; a target position information transmitting unit that transmits the information of the target position to a movable lens operation device including a movable operating member for moving the movable lens and an operating member driving unit that drives the operating member; and a movable lens driving unit that performs first driving for moving the movable lens on the basis of a position of the operating member detected by an operating member position detection unit that detects the position of the operating member, wherein the operating member driving unit drives the operating member on the basis of the information of the target position.

According to the present invention, there is provided a lens system comprising: the lens device; and a movable lens operation device including the operating member, the operating member driving unit, and the operating member position detection unit.

According to the present invention, there is provided an imaging device comprising: the lens system; and an imaging element that captures an image of a subject through the movable lens of the lens device.

According to the present invention, there is a movable lens operation device configured to be capable of communicating with a lens device including a movable lens capable of being moved in a direction of an optical axis, the movable lens operation device comprising: a movable operating member for moving the movable lens; an operating member driving unit that drives the operating member on the basis of information of a target position of the movable lens received from the lens device; an operating member position detection unit that detects a position of the operating member; and an operating member position transmitting unit that transmits information of the position of the operating member to a movable lens driving unit of the lens device that performs first driving for moving the movable lens on the basis of the position of the operating member.

According to the present invention, there is provided a lens driving method comprising: a target position information acquiring step of acquiring information of a target position of a movable lens capable of being moved in a direction of an optical axis; a target position information transmitting step of transmitting the information of the target position to a movable lens operation device including an operating member driving unit that drives a movable operating member for moving the movable lens on the basis of the information of the target position; and a movable lens driving step of performing first driving for moving the movable lens on the basis of a position of the operating member detected by an operating member position detection unit that detects the position of the operating member.

According to the present invention, there is provided a lens driving program for causing a computer to execute: a target position information acquiring step of acquiring information of a target position of a movable lens capable of being moved in a direction of an optical axis; a target position information transmitting step of transmitting the information of the target position to a movable lens operation device including an operating member driving unit that drives a movable operating member for moving the movable lens on the basis of the information of the target position; and a movable lens driving step of performing first driving for moving the movable lens on the basis of a position of the operating member detected by an operating member position detection unit that detects the position of the operating member.

According to the present invention, it is possible to provide a lens device, a lens system, an imaging device, a movable lens operation device, a lens driving method, and a lens driving program which are capable of supporting an imaging operation by making it possible to intuitively ascertain the position of a movable lens.

EXPLANATION OF REFERENCES 1, 2, 3: imaging system
100: lens system
110: lens device
111: focus lens
112: focus lens driving unit
113: lens controller
113a: target position information acquiring unit
113b: target position information transmitting unit
113c: movable lens driving unit
113d: operation presence/absence determining unit
114, 117, 125: communication I/F
115: half mirror
120: movable lens operation device
121: operating member
121a, 121A: base
121e: first scale
121f: second scale
121d: third scale
121E: fourth scale
121F: fifth scale
121D: sixth scale
122: position detection unit
123: operating member driving unit
124: operation controller
126: adjusting unit
200: camera body
210: imaging element
220: image processing unit
300: electronic device
4: imaging system
100A: lens system
140: lens device
141: zoom lens
142: zoom lens driving unit
143: lens controller
143a: target position information acquiring unit
143b: target position information transmitting unit
143c: movable lens driving unit
143d: operation presence/absence determining unit
144, 145, 155: communication I/F
150: movable lens operation device
151: operating member
152: position detection unit
153: operating member driving unit
154: operation controller
200A: camera body
210A: imaging element
220A: image processing unit
300A: electronic device

DESCRIPTION OF THE PREFERRED EMBODIMENTS

Figure 1:
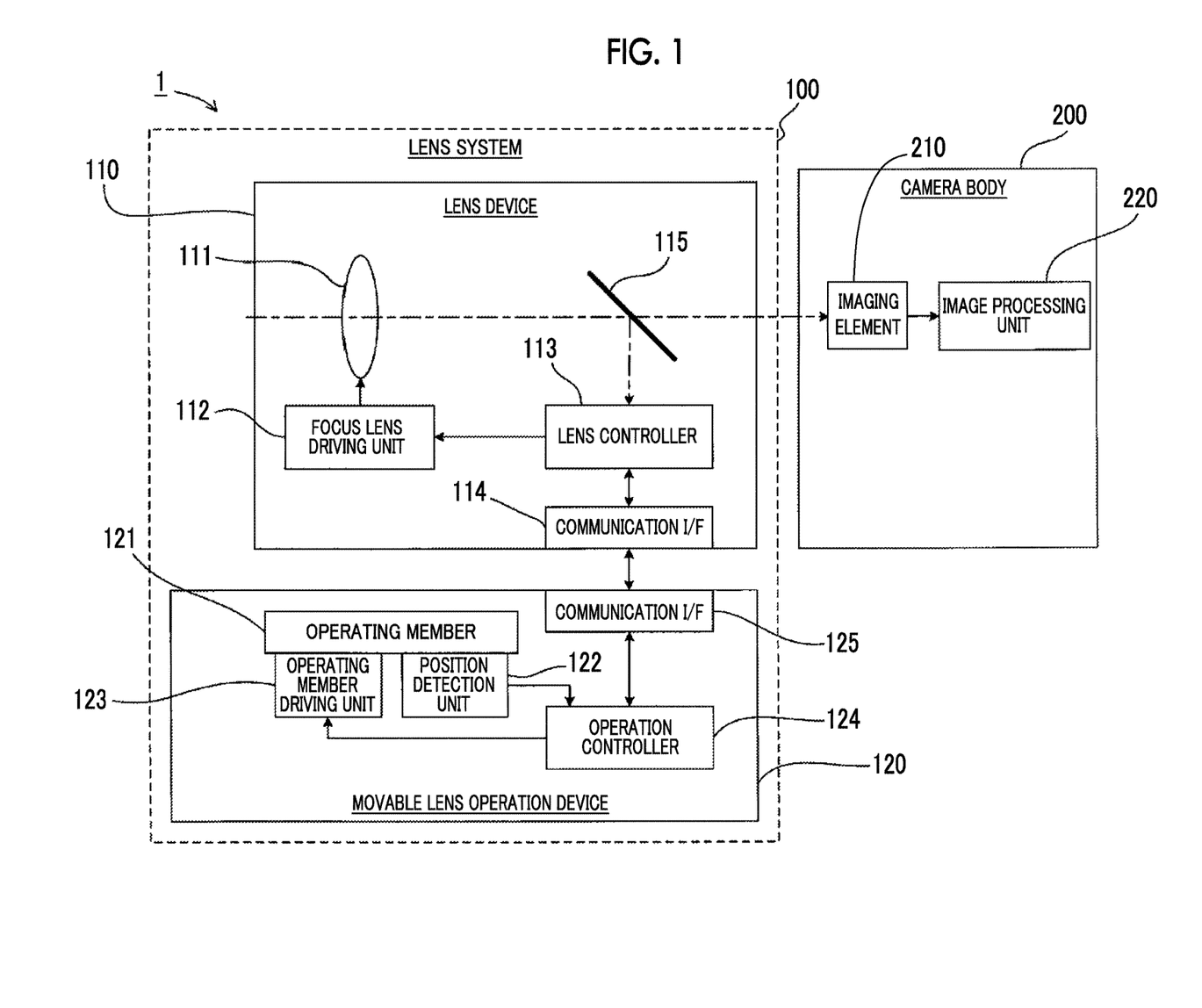
FIG. 1 is a diagram illustrating a schematic configuration of an imaging system 1 which is an embodiment of an imaging device of the present invention.

FIG. 1 is a diagram illustrating a schematic configuration of an imaging system 1 which is an embodiment of an imaging device of the present invention.

The imaging system 1 includes a lens system 100 and a camera body 200.

The lens system 100 includes a lens device 110 and a movable lens operation device 120.

The lens device 110 includes a focus lens 111, a focus lens driving unit 112, a lens controller 113, a communication interface (hereinafter, abbreviated to I/F) 114, and a half mirror 115.

The focus lens 111 is a movable lens capable of being moved in the direction of an optical axis. The focus lens refers to a lens that adjusts a focus position by moving the direction of the optical axis.

Meanwhile, although not shown in the drawing, the lens device 110 also includes other optical systems such as a lens, a stop and the like for forming a subject image in an imaging element 210. An imaging optical system of the lens device 110 is composed of the focus lens and this optical system.

The focus lens driving unit 112 is hardware for performing focus adjustment by moving the focus lens 111 in the direction of the optical axis, and is composed of a motor or the like.

The communication I/F 114 is an interface for communicating with the movable lens operation device 120 in a wired or wireless manner.

The half mirror 115 is an optical element disposed on an optical path of the imaging optical system including the focus lens 111. The half mirror 115 reflects a portion of light having passed through the focus lens 111 followed by guiding the reflected light to the lens controller 113, and transmits the rest of light having passed through the focus lens 111 followed by guiding the transmitted light to the imaging element 210.

The lens controller 113 is mainly composed of a processor, and includes a read only memory (ROM) in which a program or the like executed by the processor is stored, a random access memory (RAM) used as a work memory, and the like.

The ROM of the lens controller 113 is a computer readable non-transitory storage medium. A program stored in this ROM is stored in advance during manufacturing of the lens device 110. In addition thereto, the program may be stored by being input from an electronic device such as a personal computer, or may be stored by being downloaded in the lens device 110 through a network.

The lens controller 113 drives and controls the focus lens driving unit 112, to thereby adjust the position of the focus lens 111 in the direction of the optical axis and adjust a focus position.

The lens controller 113 drives and controls the focus lens driving unit 112 on the basis of a focus control signal received from the movable lens operation device 120 through the communication I/F 114, and performs first driving for move the focus lens 111 to a position designated by this focus control signal.

The lens controller 113 calculates the target position (hereinafter, referred to as the focus target position) of the focus lens 111 through a phase difference AF system on the basis of the reflected light from the half mirror 115, and transmits information of the calculated focus target position to the movable lens operation device 120.

The movable lens operation device 120 includes an operating member 121, a position detection unit 122, an operating member driving unit 123, an operation controller 124, and a communication I/F 125.

The operating member 121 is a movable member for manually moving the focus lens 111. An example of the operating member 121 includes a rotatable member or a slidable member.

Figure 2:
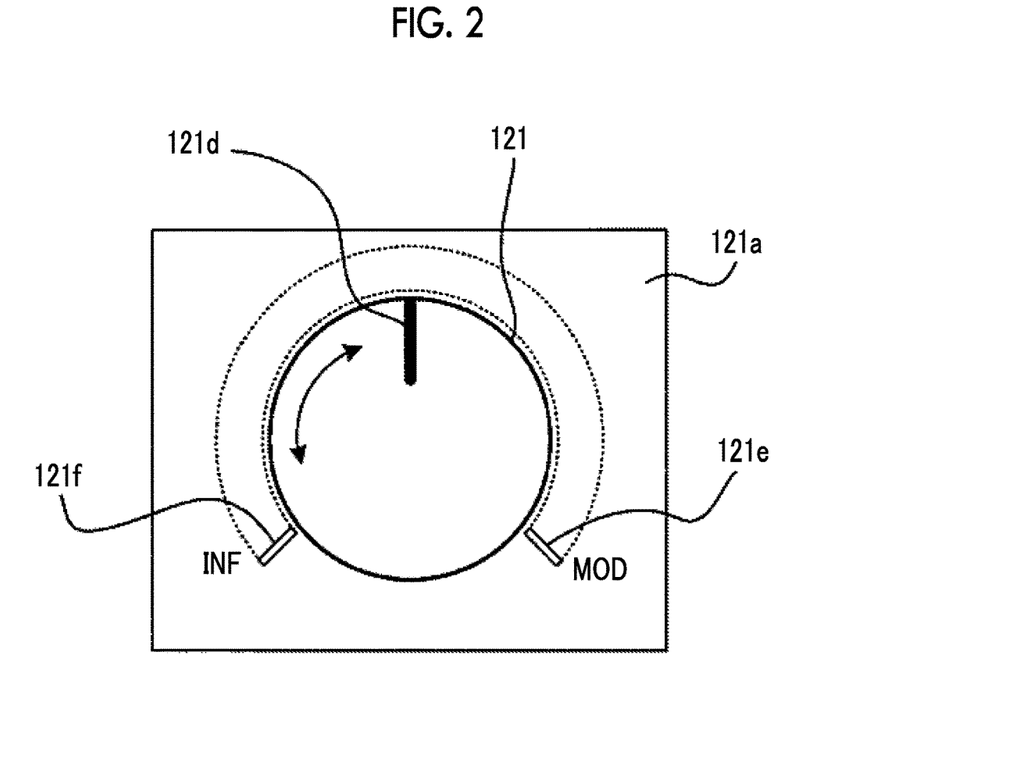
FIG. 2 is a schematic diagram illustrating a configuration example of an operating member 121 shown in FIG. 1.

FIG. 2 is a schematic diagram illustrating a configuration example of the operating member 121 shown in FIG. 1.

In the configuration example shown in FIG. 2, the operating member 121 is composed of a rotor supported rotatably with respect to a base 121a.

A first scale 121e indicating a nearest end in the movable range of the focus lens 111 and a second scale 121f indicating an infinite end in the movable range of the focus lens 111 are inscribed in the base 121a.

A range shown by a broken line connecting the first scale 121e and the second scale 121f in the rotation direction of the operating member 121 corresponds to the movable range of the focus lens 111.

A third scale 121d indicating the position of the current focus lens 111 is inscribed in the operating member 121 shown in FIG. 2. In the configuration example shown in FIG. 2, it is possible to ascertain whereabouts the focus lens 111 is located depending on the position of the third scale 121d in the range shown by a broken line.

In the configuration example shown in FIG. 2, it is possible to rotate the operating member 121 from a state where the third scale 121d of the operating member 121 becomes the same as the position of the first scale 121e in the moving direction of the operating member 121 to a state where the third scale becomes the same as the position of the second scale 121f in the moving direction of the operating member 121.

In the configuration example shown in FIG. 2, the position of the third scale 121d in the moving direction of the operating member 121 is defined as the position of the operating member 121.

Figure 3:
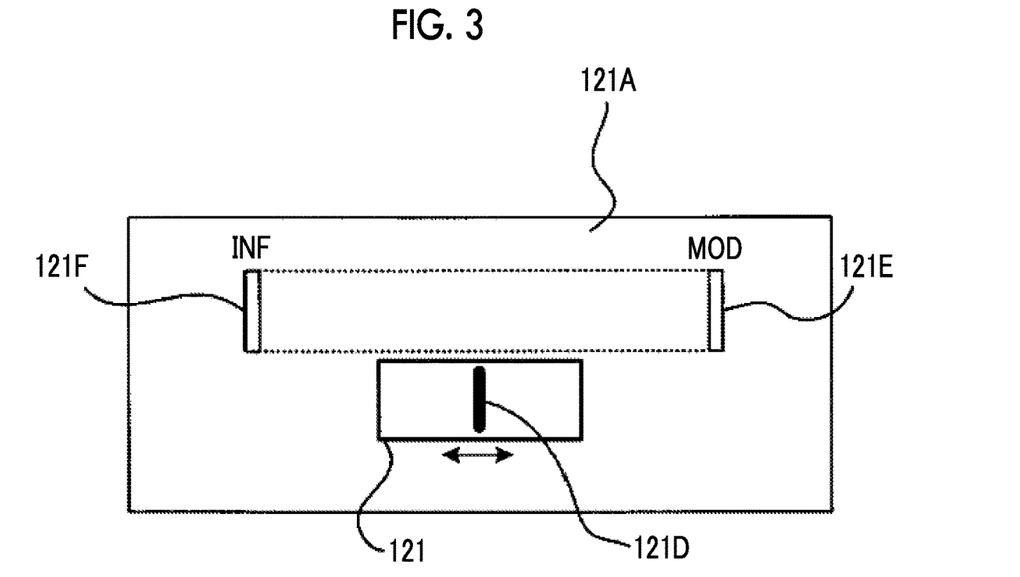
FIG. 3 is a schematic diagram illustrating another configuration example of the operating member 121 shown in FIG. 1.

FIG. 3 is a schematic diagram illustrating another configuration example of the operating member 121 shown in FIG. 1.

In the configuration example shown in FIG. 3, the operating member 121 is composed of a slide member supported movably in a horizontal direction with respect to a base 121A.

A fourth scale 121E indicating a nearest end in the movable range of the focus lens 111 and a fifth scale 121F indicating an infinite end in the movable range of the focus lens 111 are inscribed in the base 121A.

A range shown by a broken line connecting the fourth scale 121E and the fifth scale 121F in the rotation direction of the operating member 121 corresponds to the movable range of the focus lens 111.

A sixth scale 121D indicating the current position of the focus lens 111 is inscribed in the operating member 121 shown in FIG. 3. In the configuration example shown in FIG. 3, it is possible to ascertain whereabouts the focus lens 111 is located depending on the position of the sixth scale 121D in the range shown by a broken line.

In the configuration example shown in FIG. 3, it is possible to slide the operating member 121 from a state where the sixth scale 121D of the operating member 121 becomes the same as the position of the fourth scale 121E in the moving direction of the operating member 121 to a state where the sixth scale becomes the same as the position of the fifth scale 121F in the moving direction of the operating member 121.

In the configuration example shown in FIG. 3, the position of the sixth scale 121D in the moving direction of the operating member 121 is defined as the position of the operating member 121.

Referring back to FIG. 1, the position detection unit 122 of the movable lens operation device 120 is hardware for detecting the position (hereinafter, referred to as the operation position) of the operating member 121, and has a sensor using a Hall element, a magneto-resistive effect element, or the like used thereas.

An operation position signal detected by the position detection unit 122 is sent to the operation controller 124. The position detection unit 122 composes an operating member position detection unit.

The operating member driving unit 123 is hardware for driving the operating member 121, and is composed of a motor or the like.

The communication I/F 125 is an interface for communicating with the lens device 110 in a wired or wireless manner.

The operation controller 124 is mainly composed of a processor, and includes a ROM in which a program or the like executed by the processor is stored, a RAM used as a work memory, and the like.

Data indicating a correspondence relation between the position of the focus lens 111 and the operation position of the operating member 121 is stored in advance in the ROM of the operation controller 124.

The operation controller 124 drives and controls the operating member driving unit 123 on the basis of information of a focus target position received from the lens device 110, to thereby move the operating member 121 to an operation position corresponding to this focus target position.

On the basis of an operation position signal which is input from the position detection unit 122, the operation controller 124 transmits a focus control signal, including information of an operation position based on this operation position signal, to the lens device 110 through the communication I/F 125. The operation controller 124 composes an operating member position transmitting unit.

The camera body 200 includes an imaging element 210 and an image processing unit 220.

The imaging element 210 captures a subject image formed by the imaging optical system of the lens device 110 and outputs a captured image signal.

The image processing unit 220 performs signal processing on the captured image signal which is output from the imaging element 210, and outputs the processed signal as a video signal.

Figure 4:
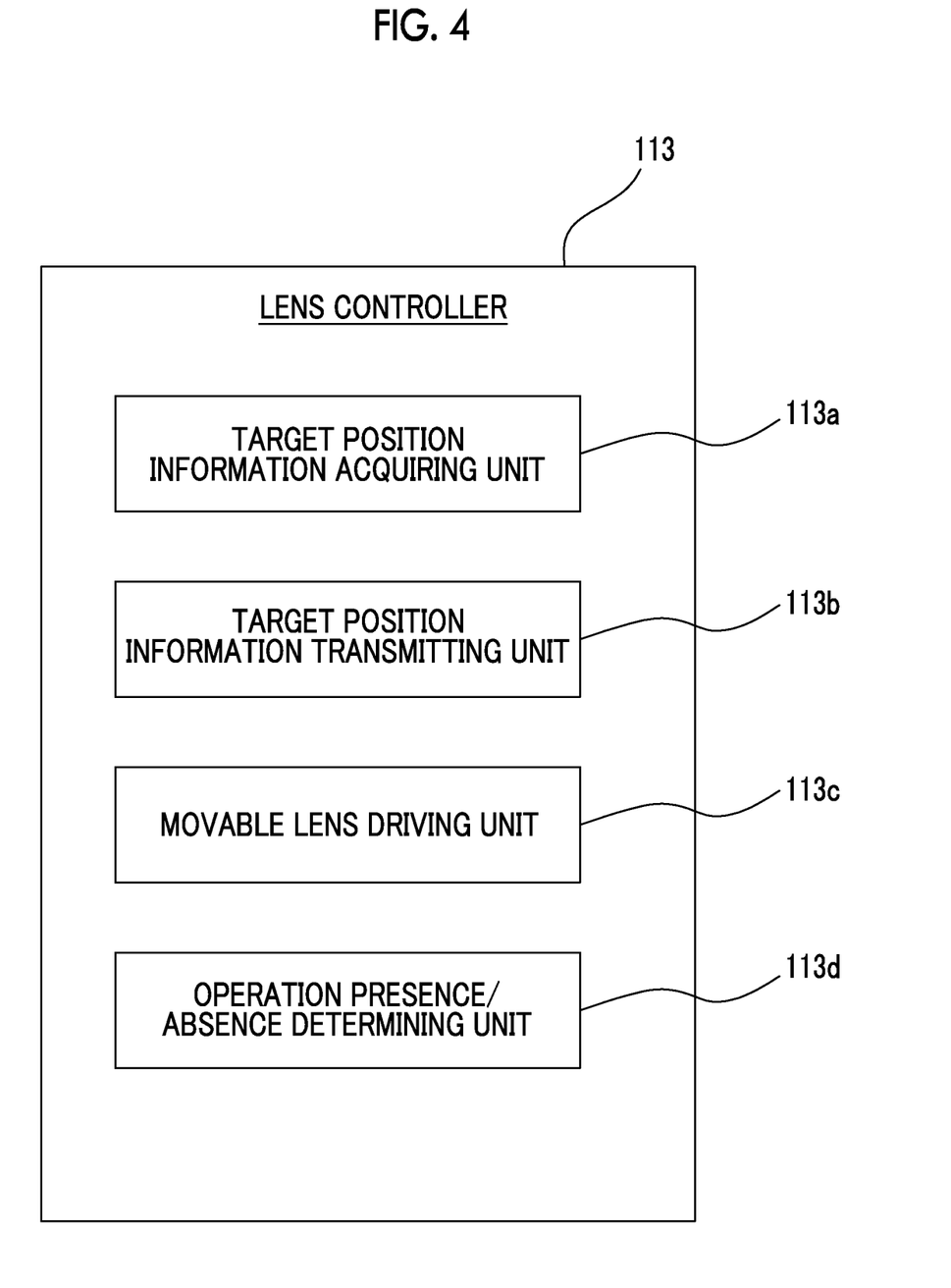
FIG. 4 is a functional block diagram of a lens controller 113 shown in FIG. 1.

FIG. 4 is a functional block diagram of the lens controller 113 shown in FIG. 1.

The lens controller 113 includes a target position information acquiring unit 113a, a target position information transmitting unit 113b, a movable lens driving unit 113c, and an operation presence/absence determining unit 113d.

The target position information acquiring unit 113a, the target position information transmitting unit 113b, the movable lens driving unit 113c, and the operation presence/absence determining unit 113d are configured by a program stored in the ROM of the lens controller 113 being executed by the processor of the lens controller 113. This program includes a lens driving program.

Data indicating a correspondence relation between operation position of the operating member 121 and the position of the focus lens 111 in the direction of the optical axis are stored in advance in the ROM of the lens controller 113.

The target position information acquiring unit 113a calculates a focus target position through a phase difference AF system on the basis of the reflected light from the half mirror 115, to thereby acquire information of the focus target position through calculation.

A system by which the target position information acquiring unit 113a calculates a focus target position is not limited to the phase difference AF system. For example, a contrast AF system may be adopted.

In a case where the focus target position is calculated by the contrast AF system, the target position information acquiring unit 113a controls the focus lens driving unit 112 to sequentially move the focus lens 111, and acquires a captured image signal obtained by capturing an image by the imaging element 210 in a state where the focus lens 111 is located at each movement position.

The target position information acquiring unit 113a calculates a contrast evaluation value on the basis of the acquired captured image signal, and sets the position of the focus lens 111 when the contrast evaluation value becomes maximum to the focus target position.

The target position information transmitting unit 113b transmits the information of the focus target position acquired by the target position information acquiring unit 113a to the movable lens operation device 120 through the communication I/F 114.

The movable lens driving unit 113c reads out the position of the focus lens 111 corresponding to an operation position included in the focus control signal, from the ROM of the lens controller 113, on the basis of the focus control signal received from the movable lens operation device 120, and performs the first driving for moving the focus lens 111 to the read-out position.

The operation presence/absence determining unit 113d determines whether the operating member 121 is operated. This determination method is arbitrary.

For example, the operation presence/absence determining unit 113d acquires an output signal of a pressure sensor or the like provided to the operating member 121 from the movable lens operation device 120, and performs the above determination depending on whether the operating member 121 is touched by an operator, on the basis of the acquired output signal.

Alternatively, the operation presence/absence determining unit 113d acquires information of an operation position corresponding to the focus target position acquired by the target position information acquiring unit 113a and information of the operation position detected by the position detection unit 122 of the movable lens operation device 120, from the movable lens operation device 120.

The operation presence/absence determining unit 113d determines that the operating member 121 is operated in a case where a difference between these two operation positions is equal to or greater than a threshold value, and determines that the operating member 121 is not operated in a case where this difference is less than the threshold value.

These two operation positions are substantially coincident with each other in a state where the operating member 121 is not operated. Therefore, it is possible to determine whether the operating member 121 is operated, depending on the difference between these two operation positions.

Meanwhile, the operation controller 124 of the movable lens operation device 120 may determine whether the operating member 121 is operated using the aforementioned method, and transmit information indicating the determination result to the lens controller 113. The lens controller 113 may perform the above determination on the basis of this information.

The operations of the imaging system 1 configured in this manner will be described below.

In the operation of the imaging system 1, a focus target position is periodically calculated in the lens device 110, and information of the focus target position is transmitted to the movable lens operation device 120.

In a case where the information of the focus target position is received from the lens device 110, the operation controller 124 of the movable lens operation device 120 reads out an operation position corresponding to this focus target position from the ROM, and moves the operating member 121 to the read-out operation position.

In addition, in the operation of the imaging system 1, the operation position of the operating member 121 is detected at all times in the movable lens operation device 120, and a focus control signal including the detected operation position is transmitted from the movable lens operation device 120 to the lens device 110.

In a case where the focus control signal is received from the movable lens operation device 120, the movable lens driving unit 113c of the lens device 110 performs the first driving for moving the focus lens 111 to a position corresponding to the current operation position, on the basis of this focus control signal.

Based on the above-described operations, the focus lens 111 is driven at the focus target position in a state where the operating member 121 is not operated. In addition, the operating member 121 has the operation position thereof changed in accordance with the focus target position.

In a case where the operating member 121 is operated in the operation of the imaging system 1, it is determined by the operation presence/absence determining unit 113d of the lens device 110 that the operating member 121 is operated, and the operation controller 124 of the movable lens operation device 120 controls the driving force of the operating member driving unit 123 for the operating member 121 to a first driving force.

In a case where the operating member 121 is not operated, it is determined by the operation presence/absence determining unit 113d of the lens device 110 that the operating member 121 is not operated, and the operation controller 124 of the movable lens operation device 120 controls the driving force of the operating member driving unit 123 for the operating member 121 to a second driving force. The second driving force has a value larger than that of the first driving force.

Meanwhile, the operation controller 124 may control the driving force of the operating member driving unit 123 for the operating member 121 so as to be constant, regardless of the presence or absence of the operation of the operating member 121.

Based on the above-described operations, in a case where a user of the imaging system 1 operates the operating member 121 to move the operating member 121 to a desired operation position, the focus lens 111 moves to a position corresponding to this operation position. That is, focus adjustment in an MF mode can be performed.

In addition, in a state where a user of the imaging system 1 does not operate the operating member 121, the operation position of the operating member 121 changes in accordance with the focus target position calculated by the lens device 110. Thereby, it is possible for a user of the imaging system 1 to intuitively ascertain the focus target position determined by the lens device 110.

In this manner, the focus target position determined by the lens device 110 can be ascertained, and thus it is possible to refer to the movement of the operating member 121 during focus adjustment in an MF mode, and to support an imaging operation.

In addition, according to the imaging system 1, the operating member 121 is driven at all times on the basis of the focus target position calculated by the lens device 110, regardless of the presence or absence of its operation.

Therefore, even in a case where the operating member 121 is being operated, a user can intuitively ascertain where, relative to the current position, the focus target position is located on the basis of the driving force of the operating member driving unit 123 for the operating member 121.

Therefore, it is possible to refer to the movement of the operating member 121 during focus adjustment in an MF mode, and to support an imaging operation.

In addition, according to the imaging system 1, in a case where the operating member 121 is operated, the driving force for the operating member 121 is controlled so as to be smaller than in a case where the operating member 121 is not operated. Therefore, the operating member 121 has a tendency to be moved during focus adjustment in an MF mode, and thus it is possible to improve its operability.

In addition, according to the imaging system 1, since the focus lens 111 is configured to move in accordance with the operation position of the operating member 121, the versatility of an existing system is high, and thus it is possible to reduce manufacturing costs by simplifying the system.

Meanwhile, in the imaging system 1, the operating member driving unit 123 may stop driving the operating member 121 in a case where it is determined by the operation presence/absence determining unit 113d of the lens device 110 that the operating member 121 is operated.

With this configuration, the operating member 121 has a tendency to be moved during focus adjustment in an MF mode, and thus it is possible to improve its operability.

In addition, in the imaging system 1, the movable lens driving unit 113c of the lens controller 113 may selectively perform second driving for moving the focus lens 111 to the focus target position on the basis of the information of the focus target position acquired by the target position information acquiring unit 113a, and the first driving.

Switching between the first driving and the second driving is performed, for example, in accordance with the operation of a switching button provided to the lens system 100.

With this configuration, during the second driving, it is possible to drive the focus lens 111 regardless of the driving capability of the operating member 151, and to perform flexible focus adjustment.

Meanwhile, it is also possible to switch between the first driving and the second driving depending on the operation state of the operating member 121 without using the switching button.

For example, the movable lens driving unit 113c performs the first driving in a case where it is determined by the operation presence/absence determining unit 113d that the operating member 121 is operated, and performs the second driving in a case where it is determined by the operation presence/absence determining unit 113d that the operating member 121 is not operated.

With this configuration, since switching between the first driving and the second driving can be performed without using a dedicated button, it is possible to reduce the manufacturing cost of the lens system 100.

In this manner, even in a configuration for switching between the first driving and the second driving depending on the presence or absence of the operation of the operating member, the driving of the operating member 121 is stopped in a case where the first driving is performed, or the driving force for the operating member 121 is made smaller than in a case where the second driving is performed, and thus it is possible to improve its operability.

Figure 5:
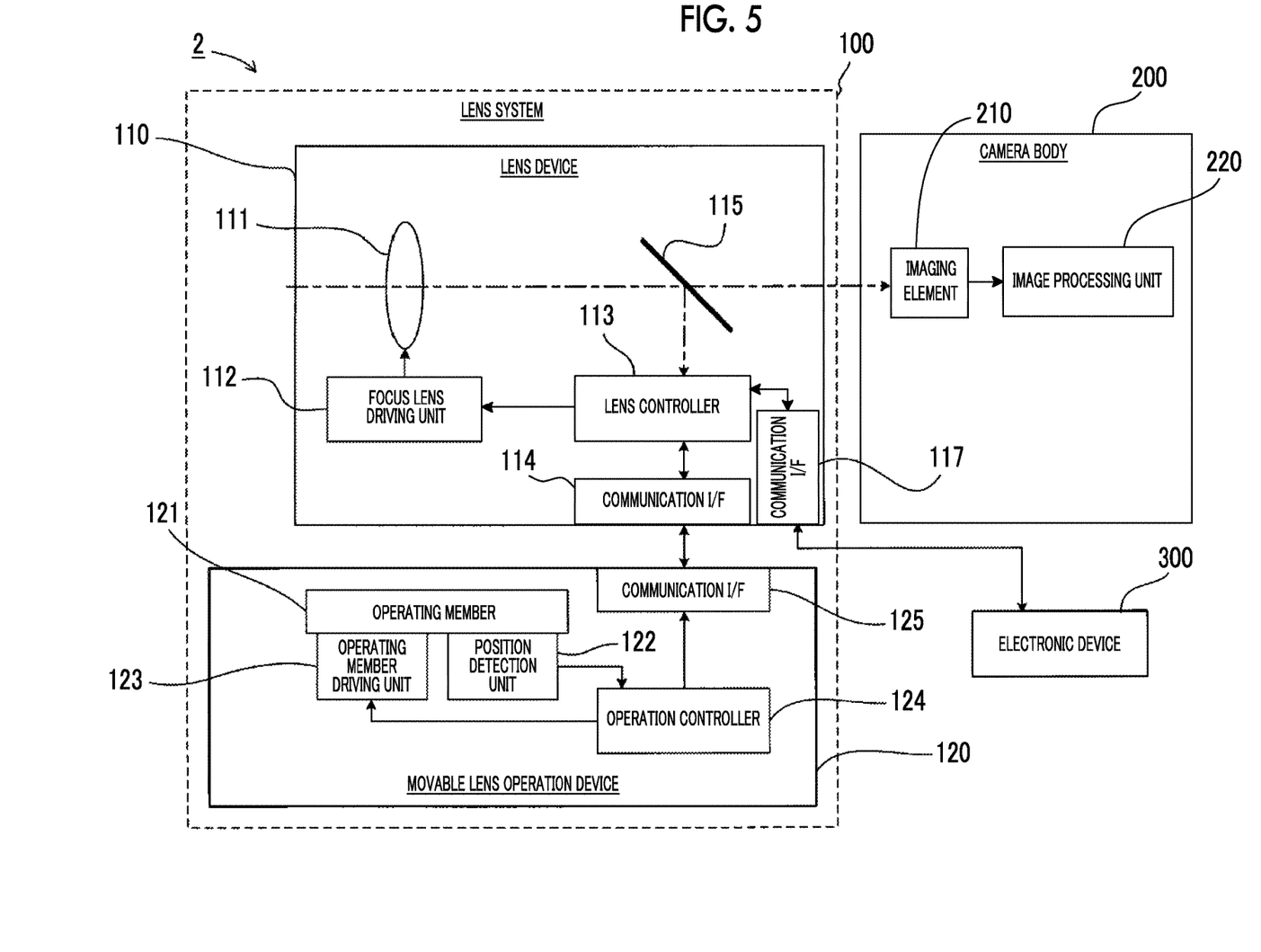
FIG. 5 is a diagram illustrating a schematic configuration of an imaging system 2 which is a modification example of the imaging system 1 shown in FIG. 1.

FIG. 5 is a diagram illustrating a schematic configuration of an imaging system 2 which is a modification example of the imaging system 1 shown in FIG. 1.

The imaging system 2 is a system capable of remotely controlling the position of the focus lens 111 in the lens device 110.

The imaging system 2 has the same configuration as that of the imaging system 1, except that a communication I/F 117 and an electronic device 300 are added, and that some functions of the lens controller 113 are different from each other. In FIG. 5, the same components as those in FIG. 1 are denoted by the same reference numerals and signs, and thus the description thereof will not be given.

The electronic device 300 is an electronic device capable of inputting information to the lens device 110, and is, for example, a personal computer or the like.

The communication I/F 117 of the lens device 110 is an interface for communicating with the electronic device 300 in a wired or wireless manner. The communication I/F 117 composes a communication unit for communicating with the electronic device 300.

The functional block diagram of the lens controller 113 is the same as that of the configuration shown in FIG. 4, but the function of the target position information acquiring unit 113a is different from that stated above, and thus a description will be given below.

The target position information acquiring unit 113a of the lens controller 113 in the imaging system 2 operates in any of a remote acquisition mode and a calculation acquisition mode.

The remote acquisition mode is a mode for acquiring the information of a focus target position from the electronic device 300 through the communication I/F 117.

The calculation acquisition mode is mode for acquiring the information of a focus target position using calculation through the phase difference AF system or the contrast AF system as described above.

Switching between the remote acquisition mode and the calculation acquisition mode is performed by the operation of a button, not shown in the drawing, which is provided to the imaging system 2, or the like.

According to the imaging system 2 configured in this manner, it is possible to obtain the same effect as that of the imaging system 1. In addition, since switching between the remote acquisition mode and the calculation acquisition mode can be performed, it is possible to cope with a case of remotely controlling the position of the focus lens 111.

During the remote acquisition mode, a user of the imaging system 2 can ascertain the intention of a person who indicates the target position of the focus lens 111 by confirming the operation position of the operating member 121.

Since this person's intention can be referred to in a case where focus adjustment is performed in an I/F mode, it is possible to support an imaging operation.

In the imaging system 2, the movable lens driving unit 113c of the lens controller 113 can also selectively perform the first driving and the second driving.

In addition, the target position information acquiring unit 113a of the lens controller 113 in the imaging system 2 may be configured to operate only in the remote acquisition mode. In this case, the half mirror 115 is not required in FIG. 5.

Figure 6:
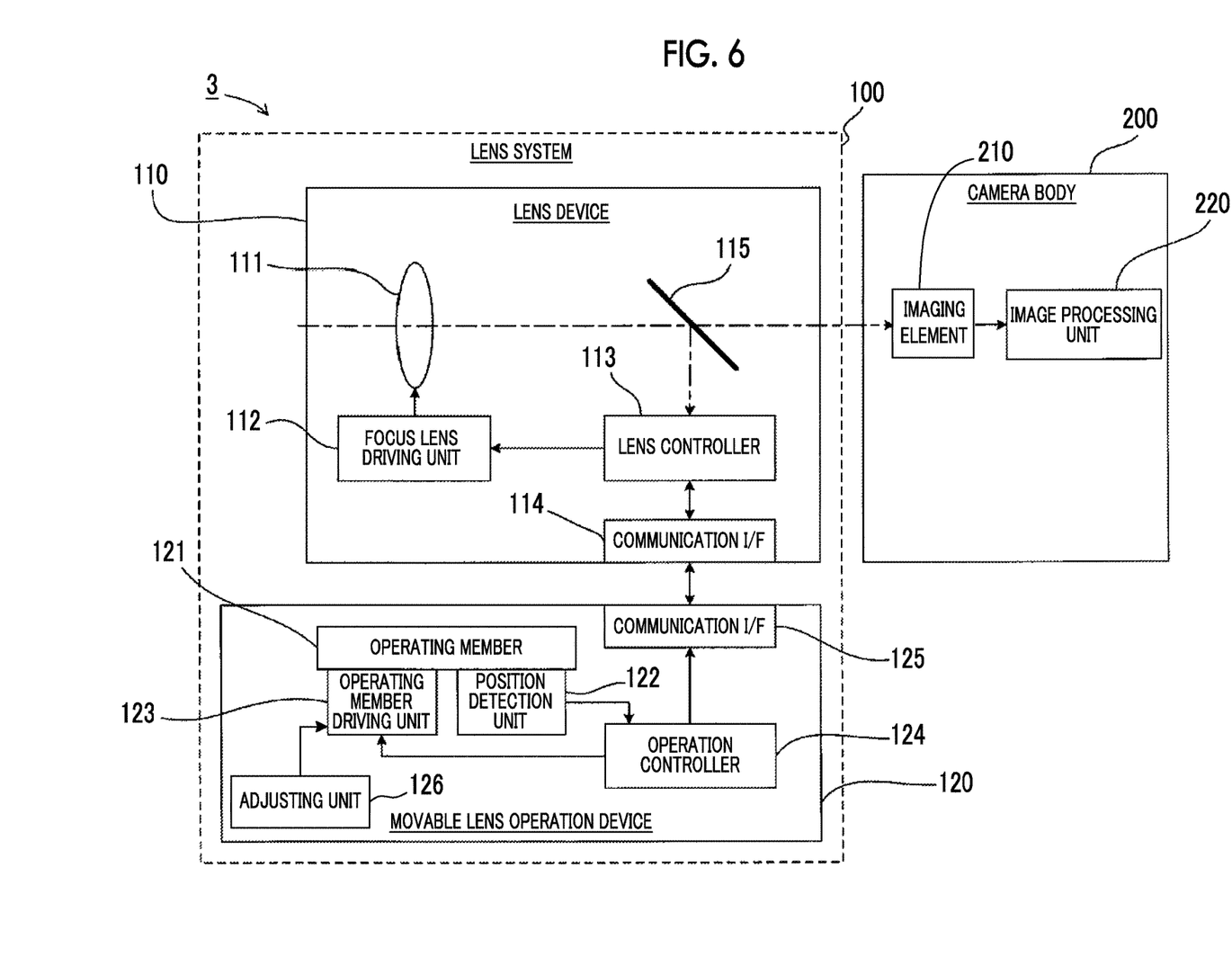
FIG. 6 is a diagram illustrating a schematic configuration of an imaging system 3 which is a modification example of the imaging system 1 shown in FIG. 1.

FIG. 6 is a diagram illustrating a schematic configuration of an imaging system 3 which is a modification example of the imaging system 1 shown in FIG. 1.

The imaging system 3 has the same configuration as that in FIG. 1, except that an adjusting unit 126 is added to the movable lens operation device 120. In FIG. 6, the same components as those in FIG. 1 are denoted by the same reference numerals and signs, and thus the description thereof will not be given.

The adjusting unit 126 adjusts the driving force of the operating member driving unit 123 for the operating member 121.

The adjusting unit 126 electrically changes the driving force of the operating member driving unit 123 for the operating member 121, and changes the driving force.

Alternatively, the adjusting unit 126 may change the amount of movement in a case where the operating member 121 is moved using a predetermined force by adding a member that attenuates the force of a damper or the like to the operating member 121, and change the driving force.

According to the imaging system 3, it is possible to adjust the driving force of the operating member driving unit 123 in accordance with a user's preference. In addition, the driving force of the operating member driving unit 123 can be adjusted, whereby, without making a change to the lens device 110, it is possible to adjust responsiveness to the movement of the focus lens 111 during an MF mode, and to reduce the manufacturing cost of the system.

The adjusting unit 126 can be similarly applied to the imaging system 2 shown in FIG. 5.

Thus far, a case has been described in which the movable lens included in the lens device 110 is a focus lens, but the present invention can also be applied to a zoom lens for adjusting a focal length which is movable in the direction of the optical axis.

Figure 7:
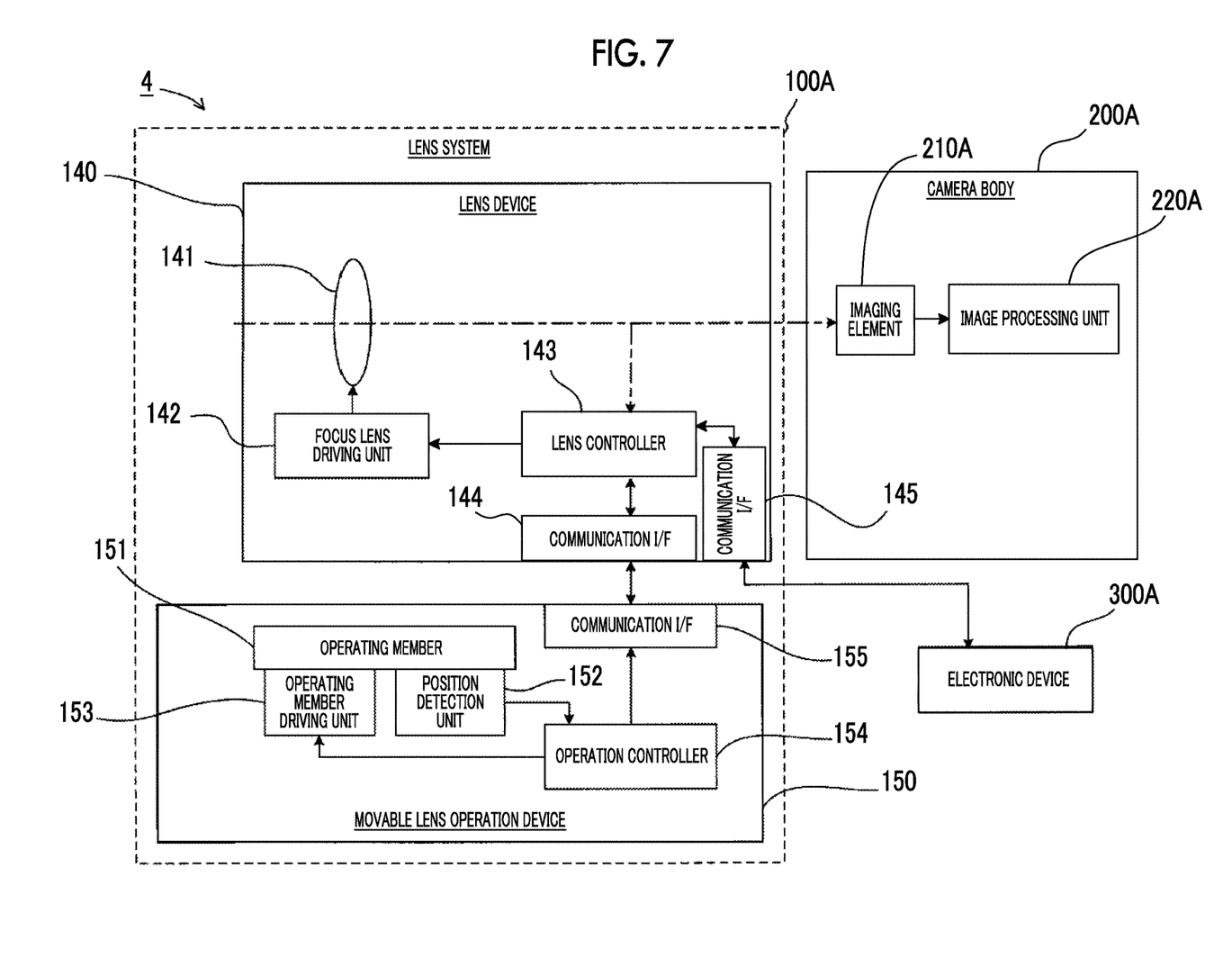
FIG. 7 is a diagram illustrating a schematic configuration of an imaging system 4 which is an embodiment of an imaging device of the present invention.

FIG. 7 is a diagram illustrating a schematic configuration of an imaging system 4 which is an embodiment of an imaging device of the present invention.

The imaging system 4 includes a lens system 100A, a camera body 200A, and an electronic device 300A.

The lens system 100A includes a lens device 140 and a movable lens operation device 150.

The electronic device 300 is an electronic device capable of inputting information to the lens device 140, and is, for example, a personal computer or the like.

The lens device 140 includes a zoom lens 141, a zoom lens driving unit 142, a lens controller 143, a communication I/F 144, and a communication I/F 145.

The zoom lens 141 is a movable lens capable of being moved in the direction of the optical axis. The zoom lens refers to a lens that adjusts a focal length by moving the direction of the optical axis.

Meanwhile, although not shown in the drawing, the lens device 140 also includes other optical systems, such as a lens, a stop or the like, for forming a subject image in the imaging element 210A. An imaging optical system of the lens device 140 is composed of the zoom lens and this optical system.

The zoom lens driving unit 142 is hardware for adjusting a focal length by moving the zoom lens 141 in the direction of the optical axis, and is composed of a motor or the like.

The communication I/F 144 is an interface for communicating with the movable lens operation device 150 in a wired or wireless manner.

The communication I/F 145 is an interface for communicating with the electronic device 300 in a wired or wireless manner. The communication I/F 145 composes a communication unit for communicating with the electronic device 300.

The lens controller 143 is mainly composed of a processor, and includes a ROM in which a program or the like executed by the processor is stored, a RAM used as a work memory, and the like.

The ROM of the lens controller 143 is a computer readable non-transitory storage medium.

A program stored in this ROM is stored in advance during manufacturing of the lens device 140. In addition thereto, the program may be stored by being input from an electronic device such as a personal computer, or may be stored by being downloaded in the lens device 140 through a network.

The lens controller 143 drives and controls the zoom lens driving unit 142, to thereby adjust the position of the zoom lens 141 in the direction of the optical axis and adjust a focal length.

The lens controller 143 transmits information of the target position (hereinafter, referred to as the zoom target position) of the zoom lens 141, acquired from the electronic device 300, to the movable lens operation device 150.

The movable lens operation device 150 includes an operating member 151, a position detection unit 152, an operating member driving unit 153, an operation controller 154, and a communication I/F 155.

The operating member 151 is a movable member for manually moving the zoom lens 141. An example of the operating member 151 includes a rotatable member or a slidable member, as illustrated in FIG. 2 or 3.

For example, the operating member 151 is configured such that, in FIG. 2, the operating member 121 is changed to the operating member 151, the first scale 121e is changed to information indicating a wide end, and that the second scale 121f is changed to information indicating a telephoto end. In this configuration example, the position of the third scale 121d in the moving direction of the operating member 151 is defined as the position of the operating member 151.

The position detection unit 152 is hardware for detecting the position (hereinafter, referred to as the operation position) of the operating member 151, and has a sensor using a Hall element, a magneto-resistive effect element, or the like used thereas.

An operation position signal detected by the position detection unit 152 is sent to the operation controller 154. The position detection unit 152 composes an operating member position detection unit.

The operating member driving unit 153 is hardware for driving the operating member 151, and is composed of a motor or the like.

The communication I/F 155 is an interface for communicating with the lens device 140 in a wired or wireless manner.

The operation controller 154 is mainly composed of a processor, and includes a ROM in which a program or the like executed by the processor is stored, a RAM used as a work memory, and the like.

Data indicating a correspondence relation between the position of the zoom lens 141 and the operation position of the operating member 151 is stored in advance in the ROM of the operation controller 154.

The operation controller 154 drives and controls the operating member driving unit 153 on the basis of information of a zoom target position received from the lens device 140, to thereby move the operating member 151 to an operation position corresponding to this zoom target position.

On the basis of an operation position signal which is input from the position detection unit 152, the operation controller 154 transmits a zoom control signal, including information of an operation position based on this operation position signal, to the lens device 140 through the communication I/F 155. The operation controller 154 composes an operating member position transmitting unit.

The camera body 200A includes an imaging element 210A and an image processing unit 220A.

The imaging element 210A captures a subject image formed by the imaging optical system of the lens device 140 and outputs a captured image signal.

The image processing unit 220A performs signal processing on the captured image signal which is output from the imaging element 210A, and outputs the processed signal as a video signal.

Figure 8:
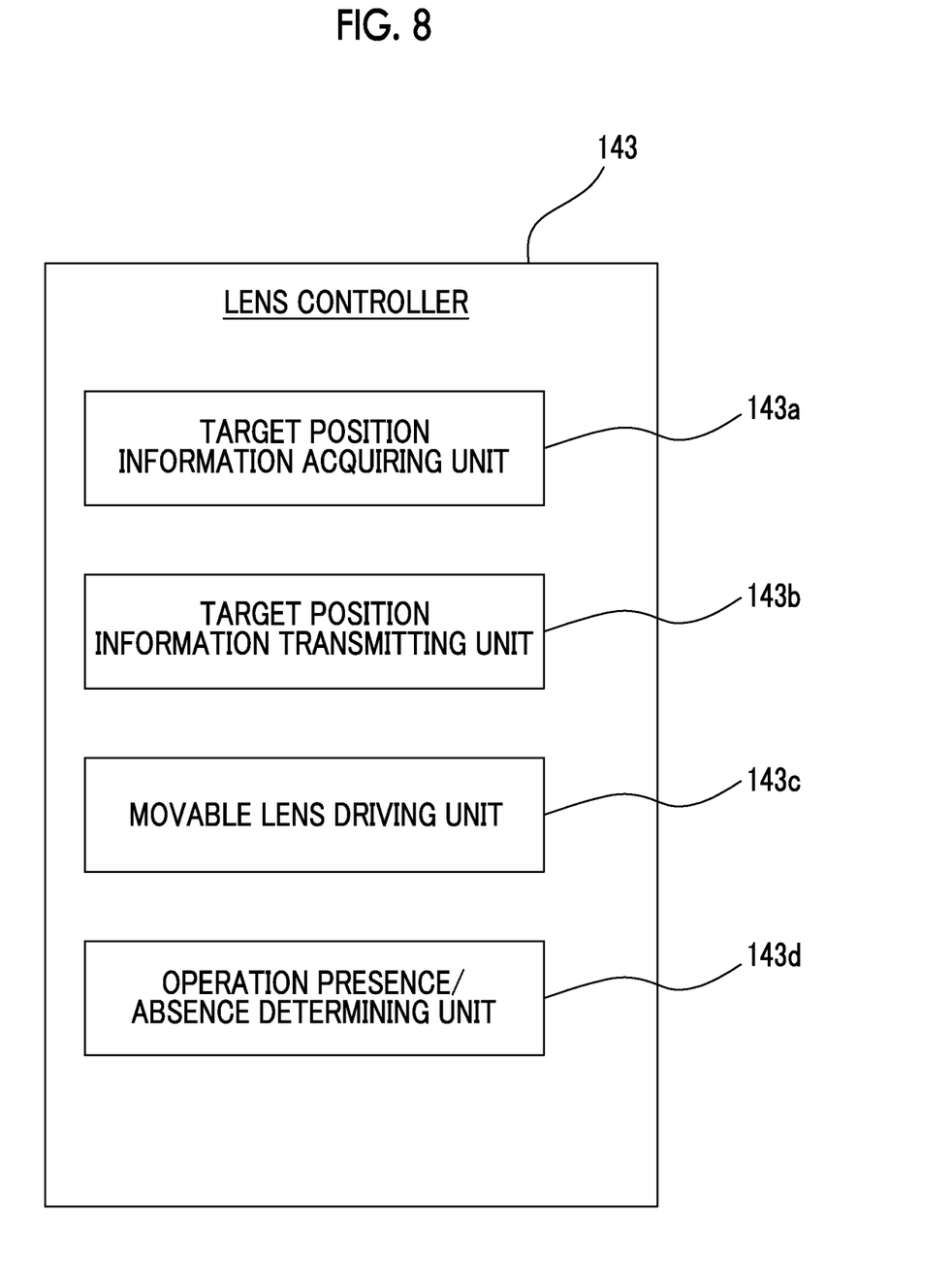
FIG. 8 is a functional block diagram of a lens controller 143 shown in FIG. 7.

FIG. 8 is a functional block diagram of the lens controller 143 shown in FIG. 7.

The lens controller 143 includes a target position information acquiring unit 143a, a target position information transmitting unit 143b, a movable lens driving unit 143c, and an operation presence/absence determining unit 143d.

The target position information acquiring unit 143a, the target position information transmitting unit 143b, the movable lens driving unit 143c, and the operation presence/absence determining unit 143d are configured by a program stored in the ROM of the lens controller 143 being executed by the processor of the lens controller 143. This program includes a lens driving program.

Data indicating a correspondence relation between the operation position of the operating member 151 and the position of the zoom lens 141 in the direction of the optical axis is stored in advance in the ROM of the lens controller 143.

The target position information acquiring unit 143a acquires information of a zoom target position from the electronic device 300.

The target position information transmitting unit 143b transmits the information of the zoom target position acquired by the target position information acquiring unit 143a to the movable lens operation device 150 through the communication I/F 144.

The operation presence/absence determining unit 143d determines whether the operating member 151 is operated. This determination method is arbitrary.

For example, the operation presence/absence determining unit 143d acquires an output signal of a pressure sensor or the like provided to the operating member 151 from the movable lens operation device 150, and performs the above determination depending on whether the operating member 151 is touched by an operator, on the basis of the acquired output signal.

Alternatively, the operation presence/absence determining unit 143d acquires information of an operation position corresponding to the zoom target position acquired by the target position information acquiring unit 143a and information of the operation position detected by the position detection unit 152 of the movable lens operation device 150, from the movable lens operation device 150.

The operation presence/absence determining unit 143d determines that the operating member 151 is operated in a case where a difference between these two operation positions is equal to or greater than a threshold value, and determines that the operating member 151 is not operated in a case where this difference is less than the threshold value.

Meanwhile, the operation controller 154 may determine whether the operating member 151 is operated using the aforementioned method, and transmit information indicating the determination result to the lens controller 143. The lens controller 143 may perform the above determination on the basis of this information.

The movable lens driving unit 143c reads out the position of the zoom lens 141 corresponding to an operation position included in the zoom control signal, from the ROM of the lens controller 143, on the basis of the zoom control signal received from the movable lens operation device 150, and performs the first driving for moving the zoom lens 141 to the read-out position.

The operations of the imaging system 4 configured in this manner will be described below.

In the operation of the imaging system 4, the information of the zoom target position is periodically transmitted from the electronic device 300 to the lens controller 143. In a case where the information of the zoom target position is acquired from the electronic device 300, the lens controller 143 of the lens device 140 transmits this information of the zoom target position to the operation controller 154.

In a case where the information of the zoom target position is received from the lens device 140, the operation controller 154 of the movable lens operation device 150 reads out an operation position corresponding to this zoom target position from the ROM, and moves the operating member 151 to the read-out operation position.

In addition, in the operation of the imaging system 4, the operation position of the operating member 151 is detected at all times in the movable lens operation device 150, and a zoom control signal including the detected operation position is transmitted from the movable lens operation device 150 to the lens device 140.

In a case where the zoom control signal is received from the movable lens operation device 150, the movable lens driving unit 143c of the lens device 140 performs the first driving for moving the zoom lens 141 to a position corresponding to the current operation position on the basis of this zoom control signal.

Thereby, in a state where the operating member 151 is not operated, the zoom lens 141 is driven to a zoom target position designated from the electronic device 300. In addition, the operating member 151 has its operation position changed in accordance with the zoom target position designated from the electronic device 300.

In a case where the operating member 151 is operated in the operation of the imaging system 4, it is determined by the operation presence/absence determining unit 143d of the lens device 140 that the operating member 151 is operated, and the operation controller 154 of the movable lens operation device 150 controls the driving force of the operating member driving unit 153 for the operating member 151 so as to have a value smaller than that in a case where the operating member 151 is not operated.

Meanwhile, the operation controller 154 may control the driving force of the operating member driving unit 153 for the operating member 151 so as to be constant, regardless of the presence or absence of the operation of the operating member 151.

Based on the above-described operations, in a case where a user of the imaging system 4 operates the operating member 151 to move the operating member 151 to a desired operation position, the zoom lens 141 moves to a position corresponding to this operation position. That is, manual zoom adjustment can be performed.

In addition, in a state where a user of the imaging system 4 does not operate the operating member 151, the operating member 151 moves to an operation position based on the zoom target position acquired by the lens controller 143. The zoom lens 141 then moves to a position according to this operation position of the operating member 151.

Thereby, it is possible for a user of the imaging system 4 to intuitively ascertain the zoom target position designated from the electronic device 300.

In this manner, the zoom target position designated from the electronic device 300 can be ascertained, and thus it is possible to refer to the movement of the operating member 151 during manual focal length adjustment, and to support an imaging operation.

In addition, according to the imaging system 4, the operating member 151 is driven at all times on the basis of the zoom target position acquired by the lens device 140, regardless of the presence or absence of its operation.

Therefore, even in a case where the operating member 151 is being operated, a user can intuitively ascertain where, relative to the current position, the zoom target position is located on the basis of the driving force of the operating member driving unit 153 for the operating member 151.

Therefore, it is possible to refer to the movement of the operating member 151 during manual focal length adjustment, and to support an imaging operation.

In addition, according to the imaging system 4, in a case where the operating member 151 is operated, the driving force for the operating member 151 is controlled so as to be smaller than in a case where the operating member 151 is not operated. Therefore, the operating member 151 has a tendency to be moved during focal length adjustment, and thus it is possible to improve its operability.

In addition, according to the imaging system 4, since the zoom lens 141 is configured to move in accordance with the operation position of the operating member 151, the versatility of an existing system is high, and thus it is possible to reduce manufacturing costs by simplifying the system.

Meanwhile, in the imaging system 4, the operating member driving unit 153 may stop driving the operating member 151 in a case where it is determined by the operation presence/absence determining unit 143d of the lens device 140 that the operating member 151 is operated.

With this configuration, the operating member 121 has a tendency to be moved during manual focal length adjustment, and thus it is possible to improve its operability.

In addition, in the imaging system 4, the movable lens driving unit 143c of the lens controller 143 may selectively perform second driving for moving the zoom lens 141 to this zoom target position on the basis of the information of the zoom target position acquired by the target position information acquiring unit 143a, and the first driving.

Switching between the first driving and the second driving is performed, for example, in accordance with the operation of a switching button provided to the lens system 100A.

With this configuration, during the second driving, it is possible to drive the zoom lens 141 regardless of the driving capability of the operating member 151, and to perform flexible zoom control.

Meanwhile, it is also possible to switch between the first driving and the second driving depending on the operation state of the operating member 151 without using the switching button.

For example, the movable lens driving unit 143c performs the first driving in a case where it is determined by the operation presence/absence determining unit 143d that the operating member 151 is operated, and performs the second driving in a case where it is determined by the operation presence/absence determining unit 143d that the operating member 151 is not operated.

With this configuration, since switching between the two modes can be performed without using a dedicated button, it is possible to reduce the manufacturing cost of the lens system 100A.

In this manner, even in a configuration for switching between the first driving and the second driving depending on the presence or absence of the operation of the operating member 151, the driving of the operating member 151 is stopped in a case where the first driving is performed, or the driving force for the operating member 151 is made smaller than in a case where the second driving is performed, and thus it is possible to improve its operability.

In the imaging system 4, the driving force of the operating member driving unit 153 for the operating member 151 may be able to be adjusted by applying the adjusting unit 126 shown in FIG. 6.

In the imaging systems 1 to 4, the lens device and the movable lens operation device may be configured to be formed integrally with each other. In this case, the lens controller also takes charge of the function of the operation controller, and the operating member, the operating member driving unit, and the position detection unit compose a movable lens operation device.

The imaging system 1 and the imaging system 3 can be applied to a lens-integrated digital camera, a lens-switched digital camera, and an imaging system for broadcast. The imaging system 2 and the imaging system 4 can be applied to an imaging system for broadcast.

As described above, the following are disclosed in the present specification.

There is disclosed a lens device comprising: a movable lens capable of being moved in a direction of an optical axis; a target position information acquiring unit that acquires information of a target position of the movable lens; a target position information transmitting unit that transmits the information of the target position to a movable lens operation device including a movable operating member for moving the movable lens and an operating member driving unit that drives the operating member; and a movable lens driving unit that performs first driving for moving the movable lens on the basis of a position of the operating member detected by an operating member position detection unit that detects the position of the operating member, wherein the operating member driving unit drives the operating member on the basis of the information of the target position.

In the disclosed lens device, the movable lens driving unit selectively performs second driving for moving the movable lens to the target position on the basis of the information of the target position, and the first driving.

The disclosed lens device further comprises an operation presence/absence determining unit that determines whether the operating member is operated, wherein the movable lens driving unit performs the first driving in a case where the operating member is operated, and performs the second driving in a case where the operating member is not operated.

In the disclosed lens device, the operating member driving unit drives the operating member on the basis of the information of the target position in each of a case where the operating member is operated and a case where the operating member is not operated.

In the disclosed lens device, in a case where the operating member is operated, the operating member driving unit makes a driving force for the operating member smaller than in a case where the operating member is not operated.

In the disclosed lens device, the operating member driving unit stops driving the operating member in a case where the operating member is operated.

In the disclosed lens device, the operation presence/absence determining unit determines that the operating member is operated in a case where a difference between the position of the operating member based on the information of the target position and the position of the operating member detected by the operating member position detection unit is equal to or greater than a threshold value.

In the disclosed lens device, in a case where the operating member is operated, the operating member driving unit makes a driving force for the operating member smaller than in a case where the operating member is not operated.

In the disclosed lens device, the operating member driving unit stops driving the operating member in a case where the operating member is operated.

The disclosed lens device further comprises an operation presence/absence determining unit that determines whether the operating member is operated, wherein the operation presence/absence determining unit determines that the operating member is operated in a case where a difference between the position of the operating member based on the information of the target position and the position of the operating member detected by the operating member position detection unit is equal to or greater than a threshold value.

In the disclosed lens device, the target position information acquiring unit acquires the information of the target position by calculating the target position on the basis of light having passed through the movable lens.

The disclosed lens device further comprises a communication unit for communicating with an electronic device, wherein the target position information acquiring unit acquires the information of the target position from the electronic device through the communication unit.

There is a disclosed lens system comprising: the lens device; and a movable lens operation device including the operating member, the operating member driving unit, and the operating member position detection unit.

The disclosed lens system further comprises an adjusting unit that adjusts a driving force of the operating member driving unit.

There is a disclosed imaging device comprising: the lens system; and an imaging element that captures an image of a subject through the movable lens of the lens device.

There is disclosed a movable lens operation device configured to be capable of communicating with a lens device including a movable lens capable of being moved in a direction of an optical axis, the movable lens operation device comprising: a movable operating member for moving the movable lens; an operating member driving unit that drives the operating member on the basis of information of a target position of the movable lens received from the lens device; an operating member position detection unit that detects a position of the operating member; and an operating member position transmitting unit that transmits information of the position of the operating member to a movable lens driving unit of the lens device that performs first driving for moving the movable lens on the basis of the position of the operating member.

In the disclosed movable lens operation device, the movable lens driving unit selectively performs second driving for moving the movable lens to the target position on the basis of the information of the target position, and the first driving.

In the disclosed movable lens operation device, the lens device further includes an operation presence/absence determining unit that determines whether the operating member is operated, and the movable lens driving unit performs the first driving in a case where the operating member is operated, and performs the second driving in a case where the operating member is not operated.

In the disclosed movable lens operation device, the operating member driving unit drives the operating member on the basis of the information of the target position in each of a case where the operating member is operated and a case where the operating member is not operated.

In the disclosed movable lens operation device, in a case where the operating member is operated, the operating member driving unit makes a driving force for the operating member smaller than in a case where the operating member is not operated.

In the disclosed movable lens operation device, the operating member driving unit stops driving the operating member in a case where the operating member is operated.

In the disclosed movable lens operation device, the operation presence/absence determining unit determines that the operating member is operated in a case where a difference between the position of the operating member based on the information of the target position and the position of the operating member detected by the operating member position detection unit is equal to or greater than a threshold value.

In the disclosed movable lens operation device, in a case where the operating member is operated, the operating member driving unit makes a driving force for the operating member smaller than in a case where the operating member is not operated.

In the disclosed movable lens operation device, the operating member driving unit stops driving the operating member in a case where the operating member is operated.

In the disclosed movable lens operation device, the lens device includes an operation presence/absence determining unit that determines whether the operating member is operated, and the operation presence/absence determining unit determines that the operating member is operated in a case where a difference between the position of the operating member based on the information of the target position and the position of the operating member detected by the operating member position detection unit is equal to or greater than a threshold value.

The disclosed movable lens operation device further comprises an adjusting unit that adjusts a driving force of the operating member driving unit.

There is disclosed a lens driving method comprising: a target position information acquiring step of acquiring information of a target position of a movable lens capable of being moved in a direction of an optical axis; a target position information transmitting step of transmitting the information of the target position to a movable lens operation device including an operating member driving unit that drives a movable operating member for moving the movable lens on the basis of the information of the target position; and a movable lens driving step of performing first driving for moving the movable lens on the basis of a position of the operating member detected by an operating member position detection unit that detects the position of the operating member.

In the disclosed lens driving method, the movable lens driving step includes selectively performing second driving for moving the movable lens to the target position on the basis of the information of the target position, and the first driving.

The disclosed lens driving method further comprises an operation presence/absence determining step of determining whether the operating member is operated, wherein the movable lens driving step includes performing the first driving in a case where the operating member is operated, and performing the second driving in a case where the operating member is not operated.

In the disclosed lens driving method, the operating member driving unit drives the operating member on the basis of the information of the target position in each of a case where the operating member is operated and a case where the operating member is not operated.

In the disclosed lens driving method, in a case where the operating member is operated, the operating member driving unit makes a driving force for the operating member smaller than in a case where the operating member is not operated.

In the disclosed lens driving method, the operating member driving unit stops driving the operating member in a case where the operating member is operated.

In the disclosed lens driving method, the operation presence/absence determining step includes determining that the operating member is operated in a case where a difference between the position of the operating member based on the information of the target position and the position of the operating member detected by the operating member position detection unit is equal to or greater than a threshold value.

In the disclosed lens driving method, in a case where the operating member is operated, the operating member driving unit makes a driving force for the operating member smaller than in a case where the operating member is not operated.

In the disclosed lens driving method, the operating member driving unit stops driving the operating member in a case where the operating member is operated.

The disclosed lens driving method further comprises an operation presence/absence determining step of determining whether the operating member is operated, wherein the operation presence/absence determining step includes determining that the operating member is operated in a case where a difference between the position of the operating member based on the information of the target position and the position of the operating member detected by the operating member position detection unit is equal to or greater than a threshold value.

In the disclosed lens driving method, the target position information acquiring step includes acquiring the information of the target position by calculating the target position on the basis of light having passed through the movable lens.

In the disclosed lens driving method, the target position information acquiring step includes acquiring the information of the target position from an electronic device capable of communicating with a lens device including the movable lens.

There is disclosed a lens driving program for causing a computer to execute: a target position information acquiring step of acquiring information of a target position of a movable lens capable of being moved in a direction of an optical axis; a target position information transmitting step of transmitting the information of the target position to a movable lens operation device including an operating member driving unit that drives a movable operating member for moving the movable lens on the basis of the information of the target position; and a movable lens driving step of performing first driving for moving the movable lens on the basis of a position of the operating member detected by an operating member position detection unit that detects the position of the operating member.

According to the present invention, it is possible to provide a lens device, a lens system, an imaging device, a movable lens operation device, a lens driving method, and a lens driving program which are capable of supporting an imaging operation by making it possible to intuitively ascertain the position of a movable lens.

Hereinbefore, while the present invention has been described on the basis of a specific embodiment, the present invention is not limited to this embodiment, and various changes and modifications can be made without departing from the technical idea of the invention disclosed.

This application claims priority from Japanese Patent Application No. 2016-070726 filed on Mar. 31, 2016, the content of which is incorporated herein by reference in its entirety.

What is claimed is:

1. A lens device comprising:
a movable lens capable of being moved in a direction of an optical axis;
an optical member that reflects a portion of light having passed through the movable lens;
a target position information acquiring unit that acquires information of a target position of the movable lens by calculating the target position based on the reflected light;
a target position information transmitting unit that transmits the information of the target position to a movable lens operation device comprising a movable operating member for moving the movable lens and an operating member driving unit that drives the operating member;
a movable lens driving unit that selectively performs: first driving for moving the movable lens based on a position of the operating member detected by an operating member position detection unit that detects the position of the operating member; and
second driving for moving the movable lens to the target position based on the information of the target position; and
an operation presence/absence determining unit that determines whether the operating member is operated,
wherein the movable lens driving unit performs the first driving in a case where the operating member is operated, and performs the second driving in a case where the operating member is not operated, and
the operating member driving unit drives the operating member based on the information of the target position in each of a case where the operating member is operated and a case where the operating member is not operated, and in a case where the operating member is operated, the operating member driving unit makes a driving force for the operating member smaller than in a case where the operating member is not operated,
wherein the operating member is driven at all times during the first driving and the second driving.

2. The lens device according to claim 1,
wherein the operation presence/absence determining unit determines that the operating member is operated in a case where a difference between the position of the operating member based on the information of the target position and the position of the operating member detected by the operating member position detection unit is equal to or greater than a threshold value.

* * * * *